Feb. 25, 1958 K. WILFERT 2,824,751
TORSION ROD SPRING SYSTEM FOR VEHICLES, ESPECIALLY MOTOR VEHICLES
Original Filed June 10, 1954
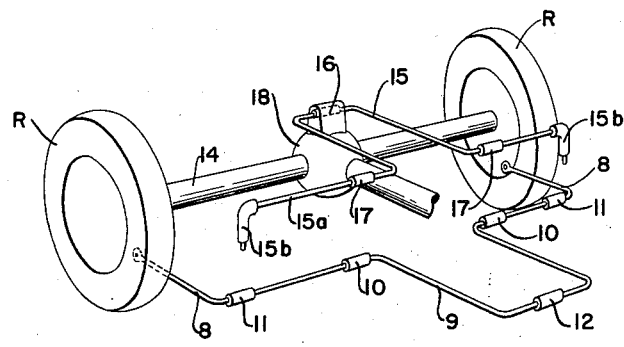
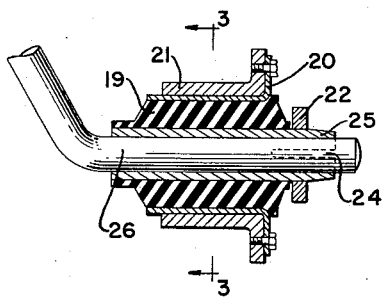 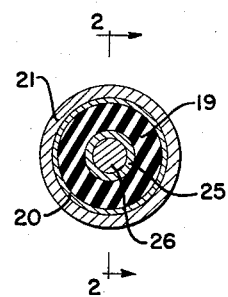
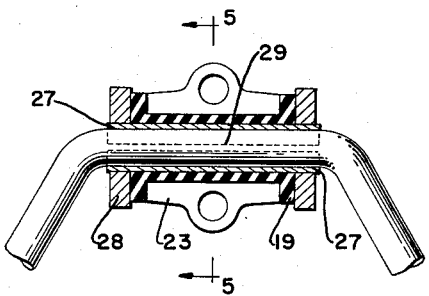 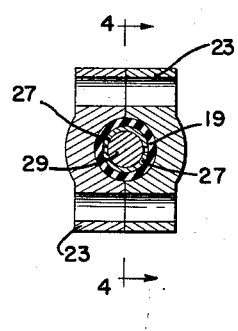
INVENTOR
KARL WILFERT
BY *Dicke and Gray*
ATTORNEYS

United States Patent Office

2,824,751
Patented Feb. 25, 1958

2,824,751

TORSION ROD SPRING SYSTEM FOR VEHICLES, ESPECIALLY MOTOR VEHICLES

Karl Wilfert, Stuttgart-Degerloch, Germany, assignor to Daimler-Benz Aktiengesellschaft, Stuttgart-Unterturkheim, Germany Original application June 10, 1954, Serial No. 435,845. Divided and this application May 23, 1955, Serial No. 511,733

Claims priority, application Germany July 1, 1953

6 Claims. (Cl. 280—124)

The present application is a divisional application of my co-pending patent application Serial No. 435,845, entitled, "Torsion Rod Spring System for Vehicles Especially Motor Vehicles," filed in the United States Patent Office on June 10, 1954.

The present invention relates to a torsion rod spring system for vehicles, especially for motor vehicles. More particularly, the present invention relates to a novel, improved and simplified suspension of the wheels of motor vehicles by means of torsion rod springs which are bent suitably for the purpose hereinabove described.

Accordingly, it is an object of the present invention to provide a simplified wheel suspension, and particularly, a simplified and improved arrangement of guide links for the wheels.

It is a further object of the present invention to provide guide links for the wheels which are formed as torsion rods and which may take the place of the ordinary guide links used heretofore in accordance with wheel suspensions.

It is still another object of the present invention to provide a guide link in the form of a torsion rod which may be installed easily and which dispenses with the ordinary guide link system in wheel suspensions, thereby greatly reducing the cost involved in the manufacture and assembly thereof.

It is another object of the present invention to provide an improved system of guide links for the wheels of motor vehicles which are in the form of torsion rods bent either U-shaped or V-shaped, and which dispenses with the necessity of two guide links, namely, an upper and a lower guide link for each wheel as used heretofore, a single torsion rod guide link in accordance with the present invention being sufficient for purposes of guiding the wheel.

It is still another object of the present invention to provide a torsion rod guide link system for the wheels of motor vehicles wherein the torsion rods used with two wheels are joined into a single spring.

It is still another object of the present invention to provide a combined spring suspension for the wheels and for the axles of these wheels which are each guided springly independently of one another by means of torsion rods.

A still further object resides in the provision of bearings, particularly so-called metal-rubber bearings, which are particularly suitable for supporting the torsion rods of the present invention and which absorb the axial thrusts and shearing forces produced in the bearings by means of positive abutments or stopping members.

The present invention consists essentially in that a torsion rod is bent at an angle in such a manner as to directly constitute a guide link for the wheel of a motor vehicle. In particular, the guide link of the present invention consists of a bow-like, U-shaped or V-shaped portion formed in the torsion rod. By the direct and immediate use of the torsion rod as guide link for the wheel, it is possible to dispense either entirely or at least partially with special pivotal arrangements and connections of additional guide link members for the wheels, which simplifies the wheel suspension very considerably. The bow-shaped bent-out portion of the torsion rod also permits to dispense with the use of special thrust rods or struts.

Any desired effective length of the spring may be utilized by bending back the torsion rod upon itself and supporting the same at the desired bent-back portion. This also enables a supporting along the extreme end of the vehicle.

Further objects, features and advantages of the present invention will become obvious from the following description when taken in accordance with the accompanying drawing which shows for purposes of illustration only several preferred embodiments in accordance with the present invention and wherein:

Figure 1 is a perspective view of a wheel suspension and guide link system in accordance with the present invention showing a dual spring suspension system.

Figure 2 shows a longitudinal sectional view of one bearing support for the end of the torsion rod in accordance with the present invention taken along line 2—2 of Figure 3.

Figure 3 is a cross-sectional view along line 3—3 of Figure 2.

Figure 4 shows a longitudinal sectional view of still another embodiment of a bearing for use with the torsion rod spring suspension in accordance with the present invention taken along line 4—4 of Figure 5, and Figure 5 is a cross-sectional view along lines 5—5 of Figure 4.

The simplest realization of the present invention is obtained by the use of a straight torsion rod which may be arranged transversely obliquely or parallel to the longitudinal direction and which is more or less angularly bent. The wheel is connected to the end of the angularly bent portion of the torsion rod in any suitable manner either rigidly or pivotally by means of suitable pins or the like.

With the occurrence of larger forces it becomes necessary to brace the spring by means of thrust rods or struts of known construction as such. However, such arrangement may be dispensed with if the angularly bent portion of the torsion rod is itself angularly shaped, as will become more obvious from the following description of the present invention.

A particularly advantageous double spring arrangement is shown in Figure 1. A torsion rod guide link 8, 8 is provided therein for each vehicle wheel R. The two guide links 8, 8 pass over into a central bow portion 9 which extends in the longitudinal direction of the vehicles either forwardly or rearwardly.

The bearings 10 are provided at the points of transition to the central bow 9. A further bearing 11, 11 each is also provided at the outer bend of the torsion rod and finally the bow portion 9 itself is once more supported by bearing 12 located substantially in the center of the bow.

The axle 14 which is formed as a swinging rigid axle is also supported by a similarly shaped spring 15, 15a and 15b. This spring consists of a central bow portion 15 which extends either forwardly or rearwardly, the bent leg portions 15a, 15a which are supported firmly by bearings 15b, 15b. The bow 15 is supported through a centrally located bearing 16. Furthermore, a bearing 17, 17 is also provided at the place of the inner bends. The bearing 16 is fastened, for example, to the differential housing 18 or to a part projecting upwardly therefrom.

It is also understood that the bow 15 may also be fastened to an uninterrupted part of a rigid axle, to an auxiliary frame or the like.

The spring members according to the embodiment of Figure 1 may be formed separately for each vehicle side or may continue, for example, forwardly to form the spring and guide link members of the front wheels.

It is also possible to point the bow 15 forwardly and the bow 9 rearwardly, or to make the lower guide link the axle guide link, while the upper guide link then constitutes the wheel guide link.

The bearings envisaged for the present invention are strictly pivot bearings. They may take on the form of friction or sleeve bearings as well as roller bearings. It is preferred, however, to use either metal rubber bearings or self-lubricating bearings of synthetic material. However, it is required of all bearings that they be able to absorb axial thrusts or shearing forces. For that purpose an axial abutment of any well-known construction may be used, such as, for example, a collar, a sleeve, or a screw.

Figures 2 and 3 show one preferred embodiment for the bearings used for the end of a rod or bow. The bearing illustrated in Figures 2 and 3 may correspond, for example, to the bearings 15b of Figure 1.

A so-called rubber metal bushing 19 is fastened on the end of the torsion rod. The bushing 19 is fastened at the vehicle frame or a similar part 21 of the vehicle frame by means of a flange 20 provided with a bore to receive suitable fastening means, such as a bolt or a screw. The axial forces are absorbed by means of a ring 22 which may be shrunk on the inner sleeve 25 of the metal rubber bearing 19 thereby firmly pressing the end of the inner sleeve 25, which is formed springily by means of a slit 24, on the end of the torsion rod 26.

The bearing according to Figures 4 and 5 which correspond to the bearings 10, 11, 16 and 17 of Figure 1, is formed of two parts and is held together by two flanges 23 provided with appropriate bores to receive suitable fastening means such as bolts or screws, which may serve simultaneously for purposes of fastening of the bearing to the vehicle frame or the like. The inner sleeve consists of halves 27 and 27' split in the longitudinal direction which are secured on the torsion rod bow 29 by means of rings 28 shrunk on the halves 27' and 27''.

The bow portions of the torsion rod in accordance with the present invention may be connected in any suitable manner with the wheel carrier as shown in Figure 1 or possibly also with the axles of the wheel.

I claim:

1. A torsion rod spring system for motor vehicles with axle means adapted to support opposite vehicle wheels comprising two superposed torsion rods, each of said torsion rods being provided with one bow-shaped portion disposed in an approximately horizontal plane, means including one of said torsion rods for suspending said opposite wheels of the vehicle, means including the other of said torsion rods for suspending said axle means of said wheels at the bow-shaped part of said other torsion rod, and bearing means for supporting said torsion rods at a fixed part of the vehicle.

2. A torsion rod spring system for motor vehicles with axle means adapted to support opposite vehicle wheels comprising two superposed torsion rods, each of said torsion rods being provided with one bow-shaped portion disposed approximately in a horizontal plane, means including one of said torsion rods for suspending said opposite wheels of the vehicle, means including the other of said torsion rods for suspending said axle means of said wheels at the bow-shaped part of said other torsion rod, and bearing means for supporting said torsion rods at a fixed part of the vehicle, at least one bow-shaped portion of each torsion rod lying in the central longitudinal plane of the vehicle and pointing in different directions.

3. A torsion rod spring system according to claim 2, wherein the upper torsion rod serves as guide link for said axle means and the lower torsion rod serves as guide link for said wheels.

4. A torsion rod spring system according to claim 2, wherein said bearing means includes rubber-metal bearings.

5. A torsion rod spring system according to claim 2, wherein said bearing means includes self-lubricating bearings made of synthetic material.

6. A torsion rod spring system for motor vehicles with axle means adapted to support opposite vehicle wheels comprising two superposed torsion rods, each of said torsion rods being provided with one bow-shaped portion, means including one of said torsion rods for suspending opposite wheels of the vehicle, means including the other of said torsion rods for suspending said axle means of said wheels at the bow-shaped part thereof, and bearing means for supporting said torsion rod at a fixed part of the vehicle, said bearing means including metal-rubber bushings, said bushings being provided with resiliency by longitudinal slits through the inner metal bushing thereof, and ring means shrunk over said inner bushing to secure the same on said torsion rods.

References Cited in the file of this patent

UNITED STATES PATENTS 2,542,363    Sarnac _____ Feb. 20, 1951

FOREIGN PATENTS 877,558    Germany _____ May 26, 1953